US008814558B2

(12) United States Patent
Schibsbye

(10) Patent No.: US 8,814,558 B2
(45) Date of Patent: Aug. 26, 2014

(54) MOULD PART, MOULD ASSEMBLY AND METHOD OF CLOSING A MOULD ASSEMBLY

(75) Inventor: Karsten Schibsbye, Boulder, CO (US)

(73) Assignee: Siemens Aktiengesellschaft, Munich (DE)

(*) Notice: Subject to any disclaimer, the term of this patent is extended or adjusted under 35 U.S.C. 154(b) by 294 days.

(21) Appl. No.: 13/438,882

(22) Filed: Apr. 4, 2012

(65) Prior Publication Data

US 2012/0251654 A1   Oct. 4, 2012

(30) Foreign Application Priority Data

Apr. 4, 2011 (EP) .................................. 11160970

(51) Int. Cl.
*B29C 33/20* (2006.01)
(52) U.S. Cl.
USPC .......... 425/450.1; 264/334; 425/453; 425/454
(58) Field of Classification Search
USPC .................... 425/450.1, 453, 454; 264/334
See application file for complete search history.

(56) References Cited

U.S. PATENT DOCUMENTS

| 6,113,382 | A  | * | 9/2000 | McNally ..................... 425/405.1 |
| 7,223,091 | B2 | * | 5/2007 | Olsen et al. ................ 425/450.1 |

FOREIGN PATENT DOCUMENTS

| DK |         171948 B1 | 8/1997 |
| GB |         130622 A  | 8/1919 |
| JP |        8258029 A  | 10/1996 |
| WO | WO 2004043679 A1  | 5/2004 |
| WO | WO 2007054088 A1  | 5/2007 |
| WO | WO 2010028613 A1  | 3/2010 |

OTHER PUBLICATIONS

Communication From European Patent Office, Sep. 12, 2011, pp. 1-4.

* cited by examiner

*Primary Examiner* — James Mackey

(57) ABSTRACT

A mold part is provided. The mold part includes a surface with a mold opening, a first arm with a connecting means for connecting a first pulley, the first arm being pivotably attached to a first attachment point of the mold part, a second arm with a connecting means for connecting a second pulley, the second arm being pivotably attached to a second attachment point of the mold part, wherein the second arm is arranged to be locked in at least two different turning positions.

19 Claims, 6 Drawing Sheets

MOULD PART, MOULD ASSEMBLY AND METHOD OF CLOSING A MOULD ASSEMBLY

CROSS REFERENCE TO RELATED APPLICATIONS

This application claims the benefits of European Patent Office application No. 11160970.7 EP filed on Apr. 4, 2011. All of the applications are incorporated by reference herein in their entirety.

FIELD OF INVENTION

The present invention relates to a mould part, in particular a mould part for moulding a wind turbine rotor blade. In addition, the invention relates to a mould assembly with at least a first and a second mould part and a means for rotating and moving the first mould part, and to a method of closing such a mould assembly.

BACKGROUND OF INVENTION

Known from the art of making wind turbine rotor blades is to manufacture separate parts (e.g. two half shells) of the blade in separate moulds and, at the end of the process, to close the mould parts together to form a full rotor blade. Subsequently, resin may be injected in the blade composite material situated in the enclosure formed by the mould parts. The mould parts may be closed about a longitudinal hinge line were a crane is used to lift one of the mould parts about the hinge line thereby forming a movement along a single arc. DK 171948 B discloses one example thereof.

WO 2007/054088 A1 discloses another method for closing a mould assembly. In this method, a double hinged pivotable mechanism allows one of the mould parts to move along two circular arcs instead of only a single one during a rotation process of the mould part which leads to closing a mould.

WO 2004/043679 A1 discloses another method for closing a mould assembly with a first and a second mould part. In this method, a hinge mechanism allows the second mould part to move along an arc into a partly closed position. The second mould part is then moved to engage the first mould part by a displacement means for a rectilinear translational movement of the second mould part.

As wind turbine rotor blades have become increasingly larger over the years the necessity for working personal to access the open mould parts from both sides for layout of, e.g., glass fibre material in the mould have increased.

In the described state of the art, handling the mould parts requires specialized hydraulic hinge mechanisms installed at and attached between the mould parts. In addition, due to the hinge mechanisms it is difficult to provide for walkways, scaffolds, etc. between the mould parts.

Furthermore, it is difficult to join the separated composite material in the moulds simultaneously whereby some parts of the material may be dislocated in relation to others. This in turn may induce, e.g., wrinkles along the edges of the joined edges of the composite material introducing weak structure points.

SUMMARY OF INVENTION

It is, therefore, an objective of the present invention to provide an advantageous mould part. It is a further objective of the present invention to provide an advantageous mould assembly and an advantageous method of closing a mould assembly.

The first objective is solved by a mould arrangement as claimed in the claims, the second objective by a mould assembly as claimed in the claims and a method of closing a mould assembly as claimed in the claims, respectively. The depending claims contain further developments of the invention.

An inventive mould part as claimed in the claims comprises:
  a surface with a mould opening;
  a first arm with a connecting means for connecting a first pulley, the first arm being pivotably attached to a first attachment point of the mould part; and
  a second arm with a connecting means for connecting a second pulley, the second arm being pivotably attached to a second attachment point of the mould part.

The second arm is arranged to be locked in at least two different turning positions.

The connecting means for connecting the second pulley may comprise a third arm being pivotably attached to the free end of the second arm. Such a third arm is advantageous in that a connected pulley can always be kept in a vertical orientation irrespective of the position in which the second arm is locked. However, it is also possible too directly connect a pulley to the second arm.

The inventive mould part can be used in an in inventive mould assembly as it is claimed in the claims. Such a mould assembly comprises:
  at least one inventive mould part as a first mould part;
  a second mould part with a second mould opening where the second mould part is a separate mould part in relation to the first mould part, i.e. it is not connected to the first mould part; and
  a rotating and moving means for rotating and moving the first mould part from a position in which its mould opening faces upwards to a position in which it is located above the second mould part with its mould opening facing downwards and for lowering it onto the second mould part.

Said rotating and moving means comprises:
  a gantry;
  a first hoist system with at least one first winch, at least one first wire and at least one first pulley connected to the first arm of the first mould part, the first hoist system being movable along the gantry;
  a second hoist system with at least one second winch, at least one second wire and at least one second pulley connected to the second arm or, if present, to the third arm of the first mould part, the second hoist system being movable along the gantry.

In that the pivotable second arm can be locked in at least two different positions it becomes possible to change the lifting point of the inventive mould part in relation to its centre of mass. This in turn allows the full handling of the mould part as a first mould part of the inventive mould assembly including lifting, rotating and positioning by use of two winch systems on a crane gantry. A crane gantry is usually already installed in factory workshop for wind turbine rotor blades. Specialized hinge systems connecting the first mould part to a second mould part are then not necessary and the mould parts can be realized as fully separated independent parts. This allows for increasing the distance between the mould parts which in turn increases accessibility of the mould parts for laying fibre stacks into the mould opening. Due to the increased distance and the missing hinge mechanism it becomes possible to provide for scaffolds, walkways, etc.

between the mould parts of a mould assembly. This increases the flexibility in using the mould parts and its also cost-effective.

Furthermore, the inventive mould assembly using an inventive mould part as a first mould part allows the first mould part to be vertically lowered from a free position above a second mould part so as to engage the second mould part along a linear path for closing a mould. By this measure it can be assured that no undesired wrinkles will occur between the composite fibres of the two mould parts.

If the second arm is longer than the first arm it becomes possible to arrange the attachment points located at different sides of a plane running through the centre of mass of the mould part and through the mould opening. By this measure an advantageous leverage effect can be achieved.

It may be useful if the inventive mould part can rest in two different stable positions. Hence, it is advantageous if the mould part comprises a base located opposite to the surface with the mould opening and a side face extending from the base to the surface with the mould opening where this side face is designed as a second base. While a mould part typically comprises a base opposite to the mould opening so that it can rest on the ground during the fibre material being laid in the opening the second base allows the mould part to rest edgewise which may be advantageous for performing actions like locking the second arm in a different position, inspecting the fibre material laid in the mould opening, etc.

At least one roller may be present where said base meets said side face. Furthermore, said base and said side face comprise feet located at distance of the at least one roller. The roller can be used for facilitating the turning when bringing the mould part from a working position in which the fibre material is laid in the mould opening to a position where it stands edgewise on the second base.

To assist in turning the mould part back from an upright position (in which it stands edgewise) to the working position the mould arrangement may comprise a means for lifting an edge that is present where the side face forming the second base meets the surface with the mould opening. Such a means for lifting the edge may, e.g. be realized as a jack, which may be a hydraulic jack, an electric jack, a pneumatic jack, etc. The jack may, in particular, be connected to at least one foot that is located at, or close to, the edge where said side face meets said surface with the mould opening.

The inventive method of closing a mould of an inventive mould assembly comprises the steps of:
  rotating the first mould part about 90 degree with the second arm locked in a first position;
  locking the second arm in a second position;
  turning the first mould part about further 90 degree with the second arm locked in the second position while or after lifting it so that its mould opening shows downwards after it has been at least partially lifted and moving the first mould part to a position above the second mould part the mould opening of which showing upwards, after the first mould part has been lifted;
  closing the mould by lowering the first mould part onto the second mould part.

The inventive method allows for turning the first mould part without a complicated hinge mechanism and for closing the mould along a linear path.

Turning and moving the first mould part with the second arm locked in the second position may, in particular, be done simultaneously. As an alternative, turning and moving the first mould part with the second arm locked in the second position may comprise a first step of turning and lifting the first mould part and a second step of horizontally moving the mould part after it has been lifted and turned by said further 90 degree.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

Figure 1:
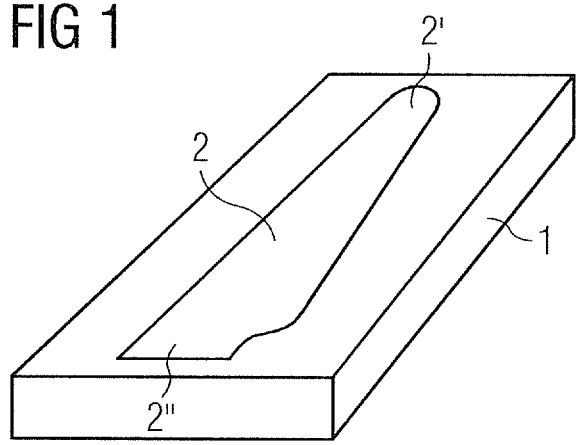
FIG. 1 schematically shows a mould part for a wind turbine rotor blade.

FIG. 1 schematically illustrates a mould part 1 for casting a wind turbine rotor blade. The mould part 1 comprises a mould opening 2 which is an impression of the surface of a half shell of a wind turbine rotor blade to be manufactured. As can be seen from FIG. 1, the mould part 1 comprises a tip section 2' and a root section 2" which are impressions of the tip section and the root section, respectively, of the blade to be formed.

Figure 2:
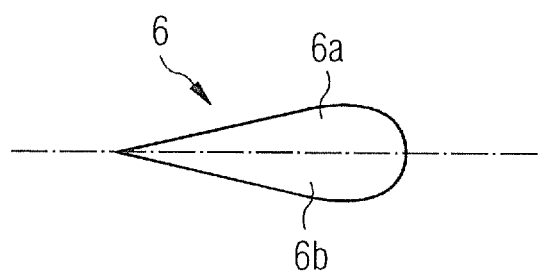
FIG. 2 schematically shows two connected blade shells.

A mould for casting a wind turbine rotor blade further comprises a second mould part. The second mould part is very similar to the first mould part and also comprises an impression of the surface of a half shell of the blade to be manufactured. Both mould parts together constitute a negative form of the blade to be manufactured when the mould is closed. A blade 6 made of a shell consisting of a first half shell 6a and a second half shell 6b is shown in FIG. 2 in sectional view. While the first half shell 6a is formed by the impression of the first mould part the second half shell 6b is formed by the impression of the second mould part.

When forming the rotor blade, layers of fibre material are laid in the mould openings so as to form a layer stack. Then the mould is closed and a curable material like a resin is introduced into the layer stack and cured so as to form a laminate composite. During resin infusion and curing of the resin a mould core may be present which is enclosed by the two mould parts so that the layer stack of fibre material is located between the mould core on the one side and one of the mould part on the other side.

An inventive mould assembly and its use will be described with respect to FIGS. 3 to 7.

Figure 3:
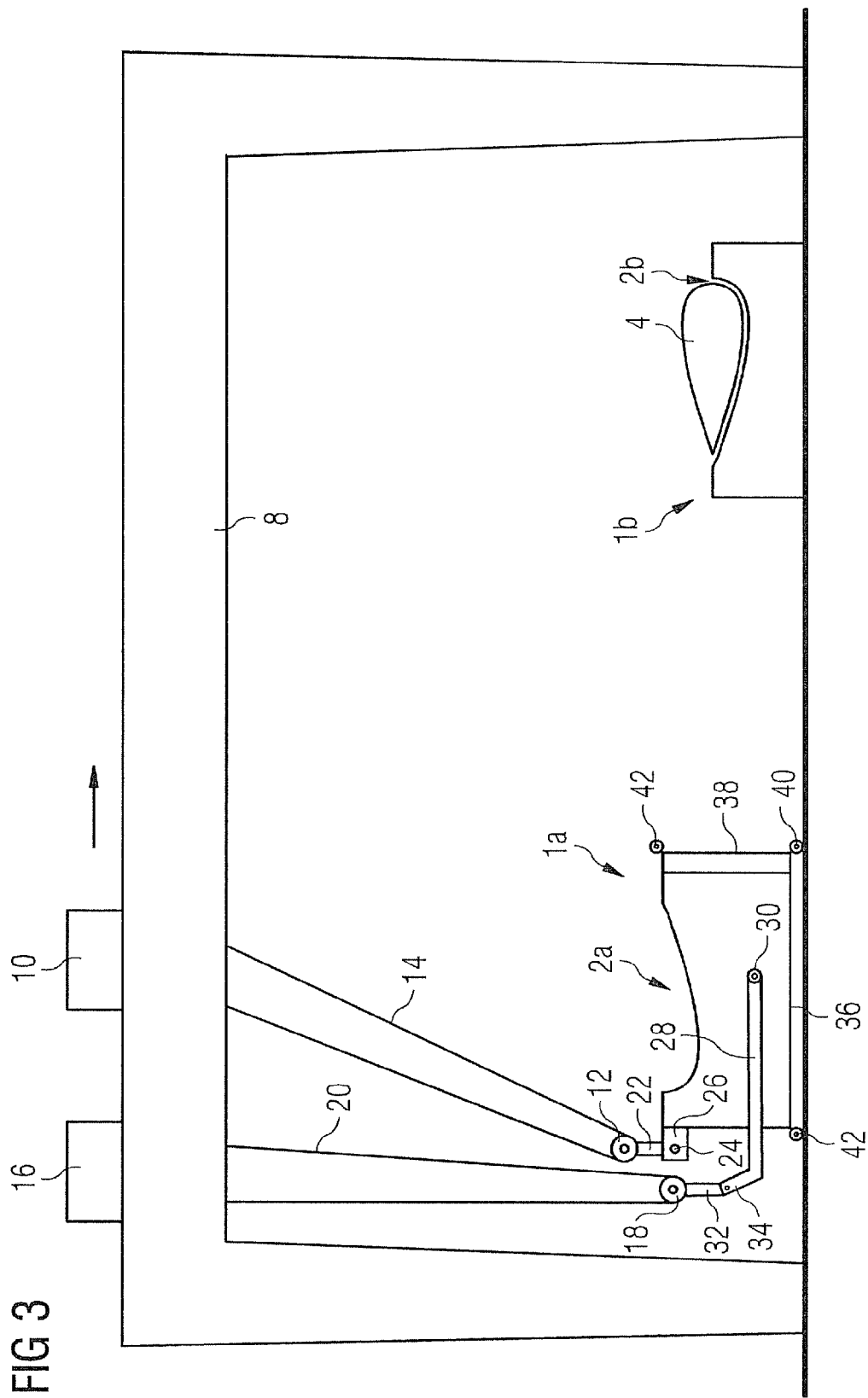
FIG. 3 schematically shows an inventive mould assembly in an arrangement according to a first step of the inventive method of closing a mould assembly.
Figure 4:
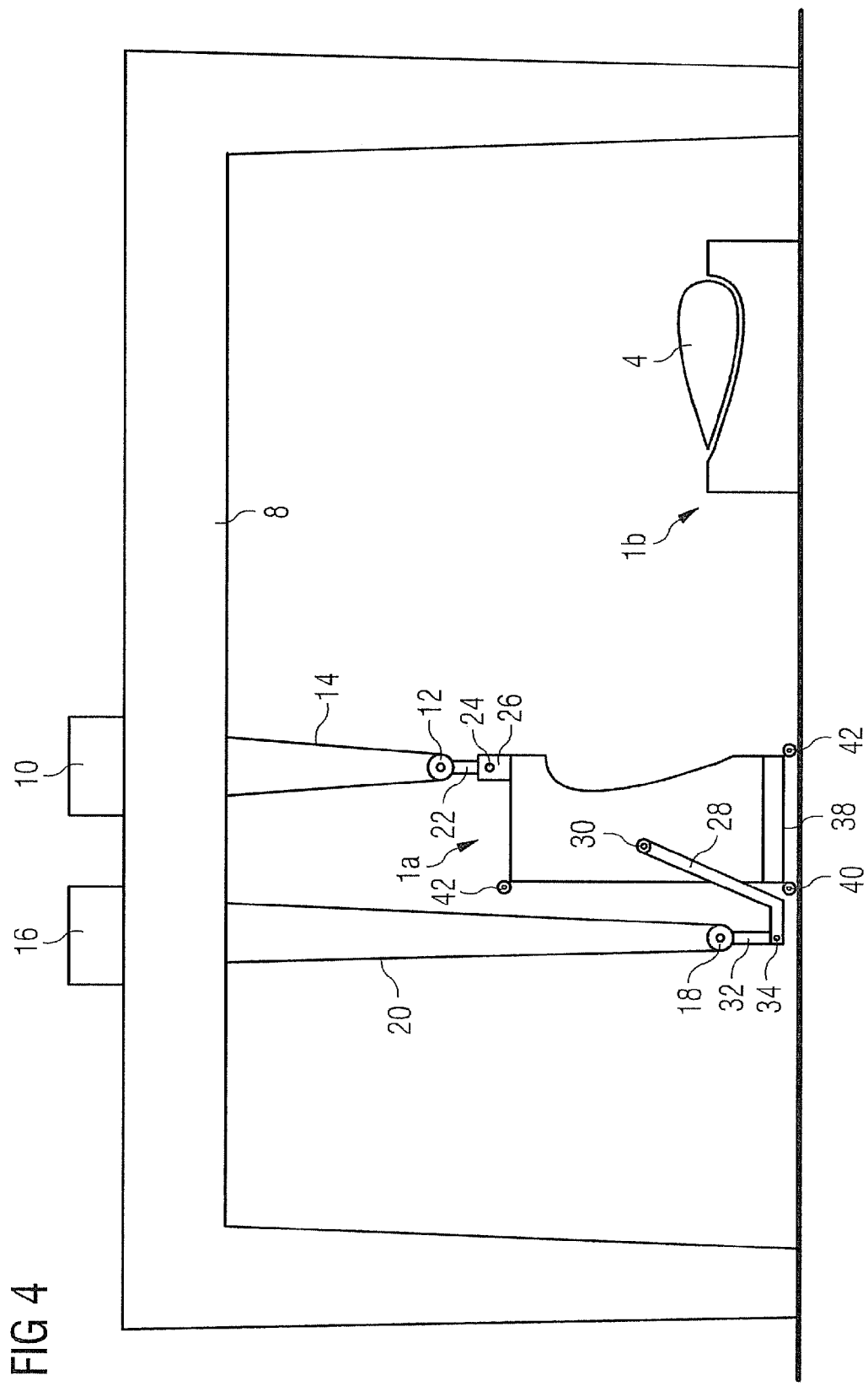
FIG. 4 schematically shows the mould assembly according to a second step of the inventive method.
Figure 5:
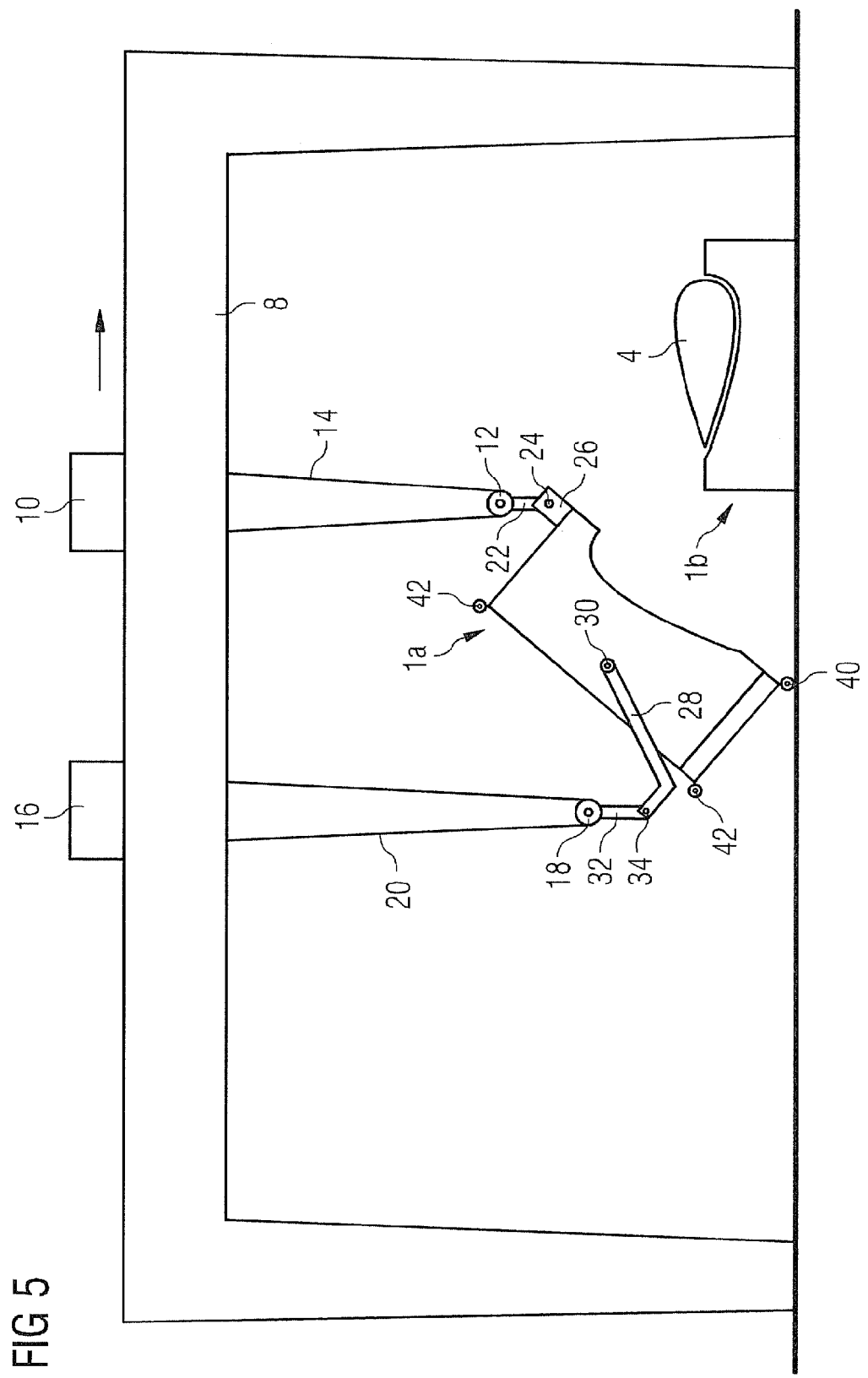
FIG. 5 schematically shows the mould assembly according to a third step of the inventive method.
Figure 6:
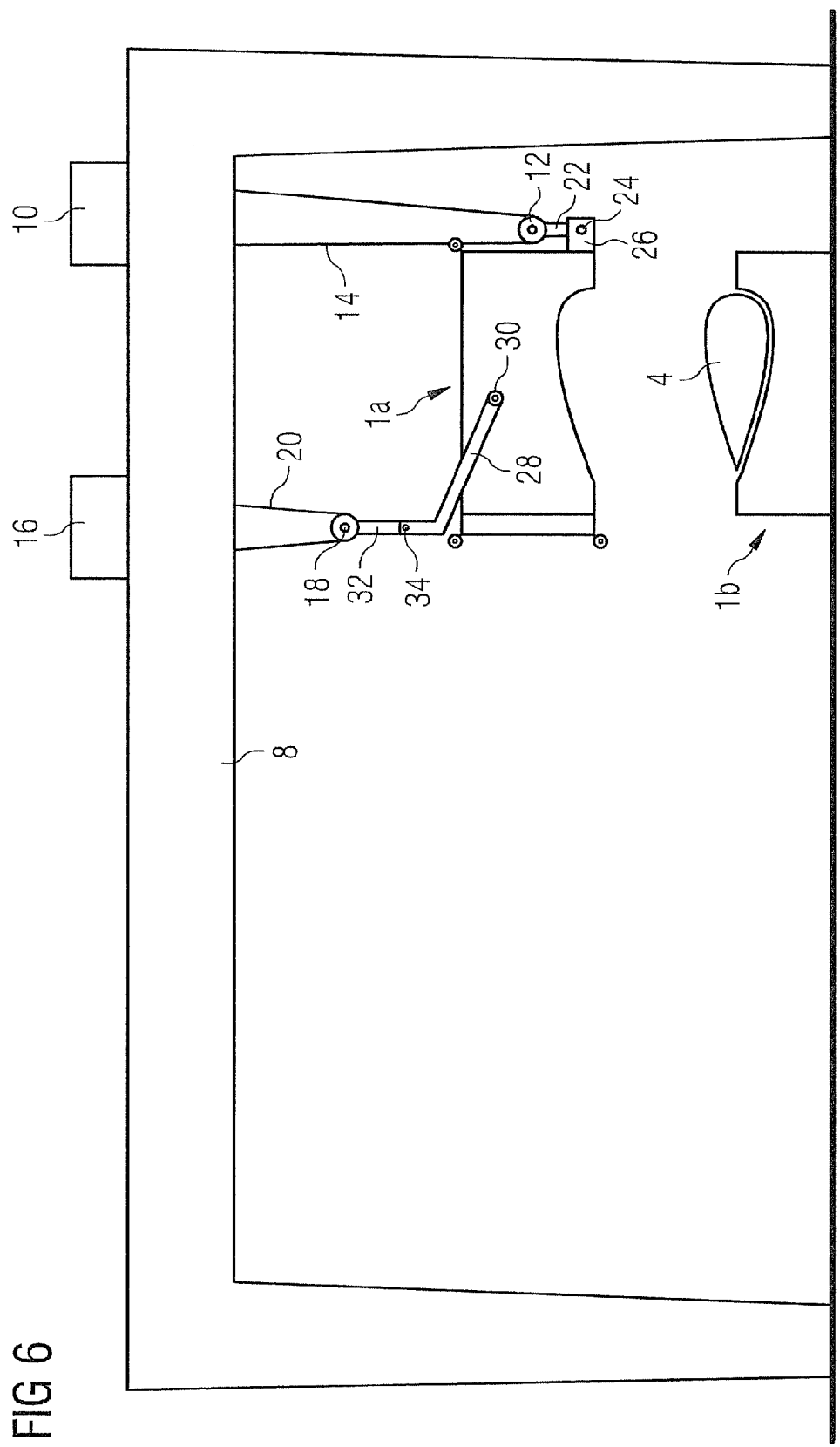
FIG. 6 schematically shows the mould assembly according to a fourth step of the inventive method.

The mould assembly comprises an inventive mould part as a first mould part 1a with a first mould opening 2a. It further comprises a second mould part 1b with a second mould opening 2b, a mould core 4 and a rotating and moving means. The rotating and moving means serves for rotating and moving the first mould part 1a from a position and an orientation as shown in FIG. 3 to a position and a orientation as shown in FIG. 6 and for closing the mould by lowering the first mould part 1a onto the second mould part 1b. The rotating and moving means comprises two hoist systems which are movably arranged on a crane gantry 8. The first hoist system comprises a winch, a pulley 12 and a wire or rope 14. Likewise, the second hoist system comprises a winch 16, a pulley 18 and a wire or rope 20. In the following, the winches, pulleys and wires of the first and the second hoist system will be referred to as first winch 10, first pulley 12, first wire 14, second winch 16, second pulley 18 and second wire 20, respectively.

The first mould part 1a is equipped with a first arm 22 to which the first pulley 12 is connected. The first arm 22 is pivotably fixed to an attachment point located at a bracket 26 of the first mould part 1a. The attachment point 24 will be referred to as first attachment point 24 in the following. The first arm 22 is pivotable about a horizontal axis running through the attachment point 24. The first wire 14 runs along the first pulley 12 and the first winch 10. It can be pulled in and let out for tensioning it and releasing it, respectively.

The first mould part 1a further comprises a second arm 28 that is pivotably attached to a second attachment point 30 of the mould part 1a and can be rotated about an axis running through the second attachment point 30 in parallel to the axis through the first attachment point 24. A third arm 32 is pivotably attached to the free end of the second arm 28 and can be rotated about an axis which runs through the third attachment point 34 and in parallel to the axes through the first and second attachment points 24, 30. The second pulley 18 is fixed to the third arm. The second wire 20 runs along the second pulley 18 and the second winch 16 and can be pulled in or let out from the second winch 16 for tensioning it and releasing it, respectively.

The attachment point 30 of the second arm 28 and the attachment point 24 of the first arm are located on opposite side of a notional plane running through the centre of mass of the first mould part 1a and the mould opening 2a. To achieve this and, at the same time, allowing both pulleys 12, 18 to be located at the same side of the mould part when the second arm 28 is in a first rotational position the second arm 28 is longer than the first arm 22 in the present embodiment.

Rotating the first mould part can be simplified by using different leverage effects. Therefore, the second arm 28, i.e. the longer arm, can be locked in at least two different turning positions. By locking the second arm in different turning positions different leverage effects can be generated. The leverage effects can be optimized when, as already mentioned with respect to the present embodiment, the second attachment point 30 is located on an opposite side of a plane running through the centre of mass and the mould opening 20a of the first mould part 1a as compared to the first attachment point 24.

The first mould part 1a of the present embodiment comprises a bottom side 36 that forms a first base of the first mould part 1a. Furthermore, a side face 38 that extends from the base forming bottom side 36 to the surface including the mould opening 2a forms a second base of the first mould part 1a. At the edge where the bottom side 36 meets the side face 38 one or more rollers 40 are present. At distance from the one or more rollers 40 feet are present, at the bottom side 36 as well as at the side face 38.

The use of the mould assembly will be described next with respect to FIGS. 3 to 7.

At the beginning, the first mould part 1a, that is fully independent from the second mould part 1b, rests on its base formed by the bottom side 36, i.e. in the present embodiment on the rollers 40 and the feet 42 located at the bottom side. With the mould opening 2a showing upwards fibre material (not shown) is laid into the mould opening 2a and secured in the mould opening, e.g. by a vacuum, by brackets, or any other fixing means. Likewise, fibre layers are laid into the mould opening 2b of the second mould part 1b which rests on the floor with the second mould opening 2b showing upwards. After the fibre layers have been laid in the mould opening 2b of the second mould part 1b a mould core 4 is put on top of the fibre layers.

To increase accessibility of the mould openings 2a, 2b, walkways or scaffolds could be located around the mould parts, in particular also between the two mould parts 1a and 1b. This is possible, since both mould parts are completely independent of each other, i.e. not connected to each other by a hinge mechanism. The walkways, scaffolds, etc. will typically be removed before closing the mould and are, therefore, not shown in the Figures.

When the fibre layers and the mould core 4 are laid into the mould openings 2a and 2b and the fibre layers in the mould opening 2a of the first mould part 1a are secured the process of closing the mould starts. In a first step, the first winch 10 is moved along the gantry 8 in the direction of the arrow shown in FIG. 3. The first wire 14 is tensioned during this movement so that the attachment point 24 to which the second arm 22 is attached is lifted and moved along an arc so that the first mould part 1a is turned by 90° from its position shown in FIG. 3, in which it rests on its first base, to the position shown in FIG. 4, in which it rests on the second base formed by the side face 38. The second wire can be kept untensioned during this movement. However, it is advantageous if the second wire is not loose during turning the first mould part 1a.

Once the first mould part 1a is turned to rest on its side face 38 the second arm 28 is rotated to a second position in which the third attachment point 34 is located close to the floor of the factory workshop and locked in this position. The second winch 16 is moved along the gantry 8 to a position above the third attachment point 34 if it was not already moved while turning the first mould part 1a.

Next, the second wire 20 of the second hoist system is tensioned so that the third attachment point is moved upwards. This leads to a further rotation of the first mould part 1a which is assisted by moving the first winch 10 along the gantry 8 in the direction shown by the arrow in FIG. 5 while the first wire 14 is kept tensioned. This measure prevents the first mould part 1a from falling onto the side with the mould opening 2a. Furthermore, both the first and second wires 14, 20 are pulled in simultaneous manner so that the first mould part 1a is lifted above the floor of a workshop while it is turned. The lifting can be started before turning the mould part 1a, simultaneously with turning the mould part 1a or after turning the mould part 1a has been initiated. In the latter case, the at least one foot 42 at the side face 38 may be realized as a roller, too.

When the first mould part 1a has been fully rotated by further 90° it is moved above the second mould part 1b by a simultaneous movement of the first and second winches 10, 16 along the gantry 8. This location is shown in FIG. 6. Note that the movement to a position above the second mould part 1b can be done simultaneously with rotating the first mould part 1a once the first mould part 1a is lifted high enough above the floor of the factory workshop. From the position shown in FIG. 6 the first mould part 1a will be lowered onto second mould part 1b to close the mould by simultaneously letting out the first and second wires 14,20.

Figure 7:
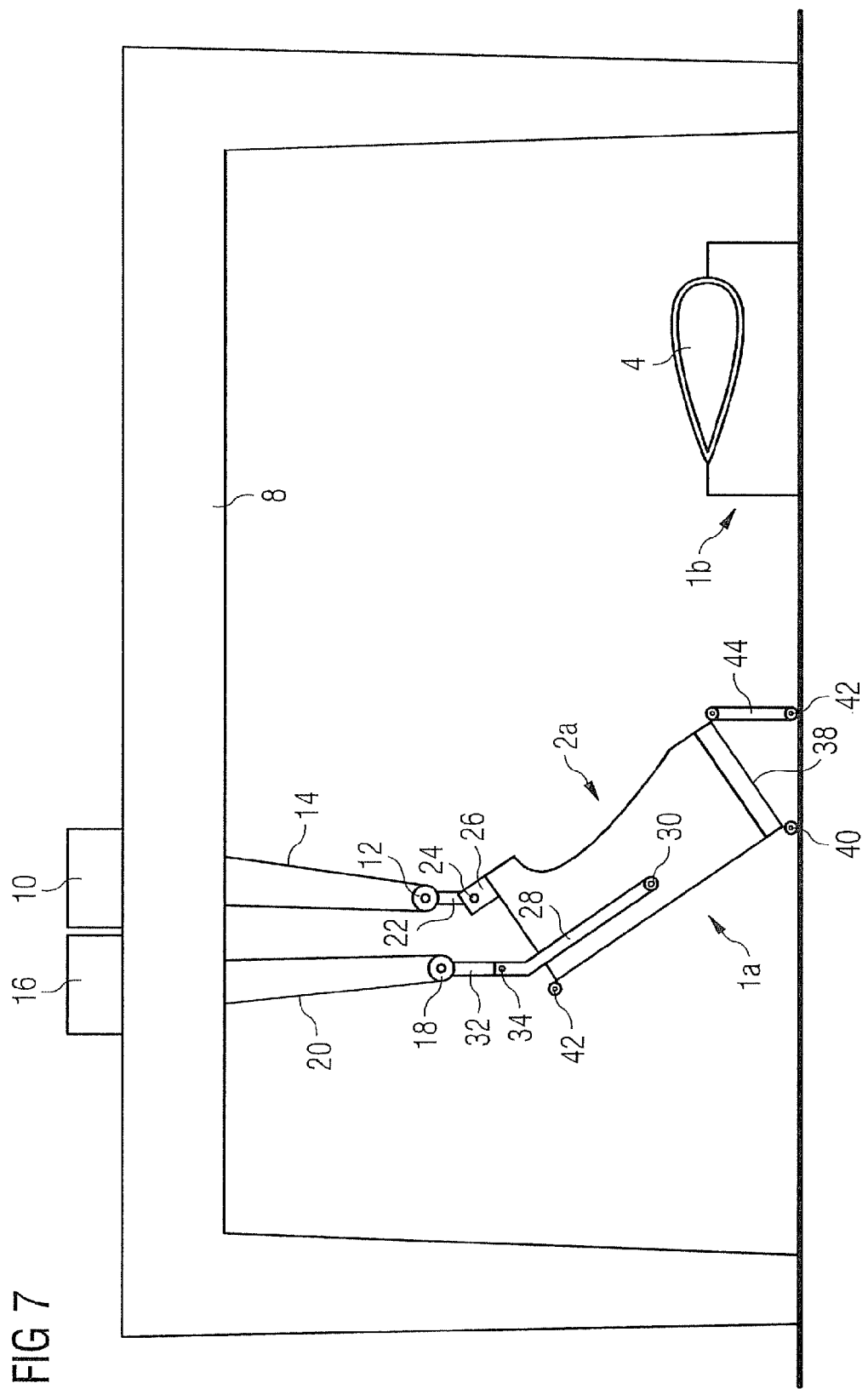
FIG. 7 schematically shows the mould assembly during a step of opening the mould assembly.

After the mould has been closed the wind turbine rotor blade can be formed by vacuum assisted resin transfer moulding (VARTM). After the resin has cured the mould is opened by reversing the steps that have been described with respect to FIGS. 3 to 6. However, for bringing the first mould part 1a back into its initial position shown in FIG. 3, it may be advantageous to introduce a further step as will be described with respect to FIG. 7. This further step will be introduced after bringing the first mould part 1a back into the position shown in FIG. 4 and bringing the second arm 28 from its rotational position shown in FIG. 4 back to its rotational position as shown in FIG. 3. In order to provide an advantageous levering effect the edge where the second base forming side face 38 meets the surface with the mould opening 2a is lifted above the floor of the factory workshop, as it is shown in FIG. 7. In the present embodiment, this is done by a jack 44 that is connected to at least one foot 42 located at, or close to, the edge where the side face 38 meets the surface with the mould opening 2a. The jack can be driven by hydraulic, pneumatic or electronic means. Even driving the jack by hand is generally possible. Lifting the edge above the floor of the factory workshop brings the centre of mass of the first mould part 1a into a position which simplifies rotating the first mould part 1a back to the position shown in FIG. 3 by use of the winches 10, 16. In particular, lifting the mentioned edge brings the centre of mass close to a vertical line running through the roller 40 so that less force is necessary to turn the first mould part 1a from a position in which it would fall back onto the second base into a position in which it would fall onto the first base formed by the bottom side 36. As a consequence only a slight turning by use of the winches 10, 16 is necessary and hence, only a small movement of the winches 10, 16 is needed.

Although the present invention has been described with respect to exemplary embodiments of the mould arrangement, the mould assembly and the method of closing the mould, these embodiments shall not limit the invention since deviations from these embodiments are possible. For example, the second arm 28 maybe lockable in more than two different positions. In addition, although only one gantry and only two hoist systems have been described two or more gantries with two hoist systems connected to each gantry can be used as well. For example, gantries with two hoist systems at both ends of the first mould part 1a are possible. Furthermore, additional hoist systems may be present at one or more gantries. For example, a third hoist system could be used for lifting the edge between the second base forming side face and the surface with the mould opening 2a in order to lift the edge when bringing the mould part back into the position shown in FIG. 3.

Although it has been described that the composite material is laid up in the mould parts and resin is infused after closing the mould, it would be possible to cast and cure the composite material laid up in the first and second mould parts 1a, 1b before closing the mould.

The invention that has been described with reference to the exemplary embodiments offers the advantage that the full handling of the mould assembly, including lifting, rotating and positioning, can be done by use of two winch systems on a crane gantry only, i.e. by using a crane gantry which is usually already installed in a factory workshop. This increases flexibility of the mould assembly and is cost effective.

I claim:

1. A mould part, comprising:
   a surface with a mould opening;
   a first arm with a connecting means for connecting a first pulley, the first arm being pivotably attached to a first attachment point of the mould part; and
   a second arm with a connecting means for connecting a second pulley, the second arm being pivotably attached to a second attachment point of the mould part,
   wherein the second arm is arranged to be locked in at least two different turning positions.

2. The mould part as claimed in claim 1, wherein the second arm is longer than the first arm.

3. The mould part as claimed in claim 1, wherein the connecting means for connecting the second pulley comprises a third arm being pivotably attached to a free end of the second arm.

4. The mould part as claimed in claim 2, wherein the connecting means for connecting the second pulley comprises a third arm being pivotably attached to a free end of the second arm.

5. The mould part as claimed in claim 1, wherein the mould part comprises a base located opposite to the surface with the mould opening and a side face extending from the base to the surface with the mould opening, the side face being designed as a second base.

6. The mould part as claimed in claim 5,
   wherein a roller is present where the base meets the side face, and
   wherein the base and the side face comprise feet located at a distance from the roller.

7. The mould part as claimed in claim 5, wherein the mould part comprises an edge where the side face meets the surface with the mould opening and wherein a means for lifting the edge is present.

8. The mould part as claimed in claim 6, wherein the mould part comprises an edge where the side face meets the surface with the mould opening and wherein a means for lifting the edge is present.

9. The mould part as claimed in claim 7, wherein the means for lifting the edge is a jack.

10. The mould part as claimed in claim 8, wherein the means for lifting the edge is a jack.

11. The mould part as claimed in claim 9,
    wherein a foot is located at the edge where the side face meets the surface with the mould opening, and
    wherein the jack is connected to the foot.

12. A mould assembly comprising:
    a first mould part as claimed in claim 1;
    a second mould part with a second mould opening where the second mould part is a separate mould part in relation to the first mould part, the second mould opening facing upward; and
    a rotating and moving means for rotating and moving the first mould part from a position in which the mould opening of the first mould part faces upwards to a position located above the second mould part with the mould opening of the first mould part facing downwards and for lowering the first mould part onto the second mould part, the rotating and moving means comprises:
    a gantry,
    a first hoist system with a first winch, a first wire and the first pulley connected to the first arm of the first mould part, the first hoist system being movable along the gantry,
    a second hoist system with a second winch, a second wire and the second pulley connected to the first mould part, the second hoist system being movable along the gantry.

13. The mould assembly as claimed in claim 12, wherein the second arm is longer than the first arm.

14. The mould assembly as claimed in claim 12, wherein the connecting means for connecting the second pulley comprises a third arm being pivotably attached to a free end of the second arm.

15. The mould assembly as claimed in claim 12, wherein the first mould part comprises a base located opposite to the surface with the mould opening and a side face extending from the base to the surface with the mould opening the side face being designed as a second base.

16. The mould assembly as claimed in claim 15,
wherein a roller is present where the base meets the side face, and
wherein the base and the side face comprise feet located at a distance from the roller.

17. A method of closing a mould assembly as claimed in claim 12, the method comprising:
rotating the first mould part about 90 degree with the second arm locked in a first position;
locking the second arm in a second position;
turning the first mould part about further 90 degree with the second arm locked in the second position while or after lifting the first mould part so that the mould opening of the first mould part faces downwards after the first mould part has been at least partially lifted and moving the first mould part to a position above the second mould part after the first mould part has been lifted;
closing the mould assembly by lowering the first mould part onto the second mould part.

18. The method as claimed in claim 17, wherein turning and moving the first mould part with the second arm locked in the second position is done simultaneously.

19. The method as claimed in claim 17, wherein the turning and moving the first mould part with the second arm locked in the second position comprises a first step of turning and lifting the first mould part and a second step of horizontally moving the first mould part after it has been lifted and turned by the further 90 degrees.

* * * * *